US012710058B2

(12) United States Patent
Yin et al.

(10) Patent No.: US 12,710,058 B2
(45) Date of Patent: Aug. 18, 2026

(54) HEAT DISSIPATION DEVICE

(71) Applicant: PURPLE CLOUD DEVELOPMENT PTE. LTD., Singapore (SG)

(72) Inventors: Dachang Yin, Hui Zhou City (CN); Shi Man Xu, Hui Zhou City (CN)

(73) Assignee: PURPLE CLOUD DEVELOPMENT PTE. LTD., Singapore (SG)

( * ) Notice: Subject to any disclaimer, the term of this patent is extended or adjusted under 35 U.S.C. 154(b) by 0 days.

(21) Appl. No.: 19/187,296

(22) Filed: Apr. 23, 2025

(65) Prior Publication Data

US 2025/0347296 A1 Nov. 13, 2025

(30) Foreign Application Priority Data

May 7, 2024 (CN) ......................... 202420973444.2

(51) Int. Cl.

| | |
|---|---|
| ***F04D 29/64*** | (2006.01) |
| ***F04D 19/00*** | (2006.01) |
| ***F04D 29/52*** | (2006.01) |
| ***H01R 13/20*** | (2006.01) |
| ***H01R 13/62*** | (2006.01) |

(52) U.S. Cl.

CPC ......... *F04D 29/644* (2013.01); *F04D 19/002* (2013.01); *F04D 29/522* (2013.01); *H01R 13/20* (2013.01); *H01R 13/6205* (2013.01); *H01R 2201/00* (2013.01)

(58) Field of Classification Search

CPC ................ H01R 13/20; H01R 13/6205; H01R 2201/00; F04D 19/002; F04D 29/52; F04D 29/522; F04D 29/644

See application file for complete search history.

(56) References Cited

U.S. PATENT DOCUMENTS

| | | | | |
|---|---|---|---|---|
| 12,338,836 B1 * | 6/2025 | Liang | .................... | F04D 29/601 |
| 2023/0366407 A1 * | 11/2023 | Chang | .................... | F04D 29/522 |
| 2024/0360844 A1 * | 10/2024 | Liao | .................... | H01F 7/02 |
| 2024/0396261 A1 * | 11/2024 | Fang | .................... | H01R 13/6205 |
| 2024/0426306 A1 * | 12/2024 | Tsai | .................... | F04D 25/0693 |

FOREIGN PATENT DOCUMENTS

| | | | |
|---|---|---|---|
| CN | 218293927 U | 1/2023 | |
| CN | 219953709 U | 11/2023 | |
| CN | 117553037 A * | 2/2024 | ............ H01R 13/73 |

OTHER PUBLICATIONS

Machine translation of CN117553037A; retrieved from EPO on Aug. 20, 2025.*

* cited by examiner

*Primary Examiner* — Sang K Kim

(74) *Attorney, Agent, or Firm* — Merchant & Gould P.C.

(57) ABSTRACT

A heat dissipation device includes a plurality of cooling fans and at least one fastening device. Each cooling fan includes at least one contact region having a plurality of conductive pins and at least one first magnet. Each fastening device includes a housing having at least one cavity formed within, a contact plate disposed within the cavity, the contact plate includes a plurality of conductive contacts that are disposed on a side of the contact plate, and at least one second magnet disposed within the cavity, wherein the fastening device is configured to connect the cooling fans via the first magnet and the second magnet.

9 Claims, 7 Drawing Sheets

HEAT DISSIPATION DEVICE

RELATED APPLICATIONS

The present application claims priority to Chinese application No. 202420973444.2, filed on May 7, 2024, which is incorporated herein by reference in its entirety.

TECHNICAL FIELD

The present disclosure is related to the field of heat dissipation devices, in particular a heat dissipation device that unitizes magnetic connectors.

BACKGROUND

As technology advances and consumer demands change, each cooling fan in a cooling device with multiple cooling fans will be assigned its own test wire for testing and subsequent maintenance to ensure the fan's operational state. As market demands change, multi-fan combinations are becoming more and more popular, especially in desktop computers or high-end servers.

When multiple cooling fans are tightly combined in the same cooling device, the built-in independent test wire may cause a series of problems for users. For example, due to the presence of multiple test wires, the users may encounter additional challenges when arranging wires. In addition, the interlacement and entanglement between the test wires can affect the neatness of the device's interior and impede air flow, reducing the device's heat dissipation efficiency.

SUMMARY

A heat dissipation device includes a plurality of cooling fans and at least one fastening device. Each cooling fan includes at least one contact region having a plurality of conductive pins and at least one first magnet. The fastening device includes a housing having at least one cavity formed within, a contact plate disposed within the cavity, the contact plate includes a plurality of conductive contacts that are disposed on a side of the contact plate, and at least one second magnet disposed within the cavity, wherein the fastening device is configured to connect the cooling fans in series via the first magnet and the second magnet.

In an embodiment, the housing includes a cover and a base where the cover is configured to be disposed on the base to form the cavity within, the conductive contacts are disposed on a side of the contact plate that faces towards the base, the base includes at least one through hole that is corresponds to positions of conductive contacts, and the conductive pins are configured to electrically connect to the conductive contacts through the through hole.

In an embodiment, the base includes a plurality of recessed slots, each disposed on one side of the through hole, and each magnet is disposed within one recessed slot.

In an embodiment, the cover includes two gripping protrusions that are symmetrically disposed along a central axis of the cover. In an embodiment, the cover includes at least one chamfered corner. In an embodiment, the base includes at least one rounded corner.

In an embodiment, the cooling fan includes a fan housing, a fan blade, and a motor, the conductive pins are disposed on the fan housing, the fan blade and the motor are disposed in the fan housing, the fan blade rotates relative to the fan housing.

Aspects of the disclosure provide a fastening device that includes a housing having a cavity formed within, a contact plate disposed within the cavity, the contact plate includes a plurality of conductive contacts that are disposed on a side of the contact plate, and at least one magnet disposed within the cavity.

BRIEF DESCRIPTION OF DRAWINGS

Aspects of the present disclosure can be understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Detailed descriptions and technical contents of the present invention are illustrated below in conjunction with the accompanying drawings. However, it is to be understood that the descriptions and the accompanying drawings disclosed herein are merely illustrative and exemplary and not intended to limit the scope of the present invention.

Figure 1:
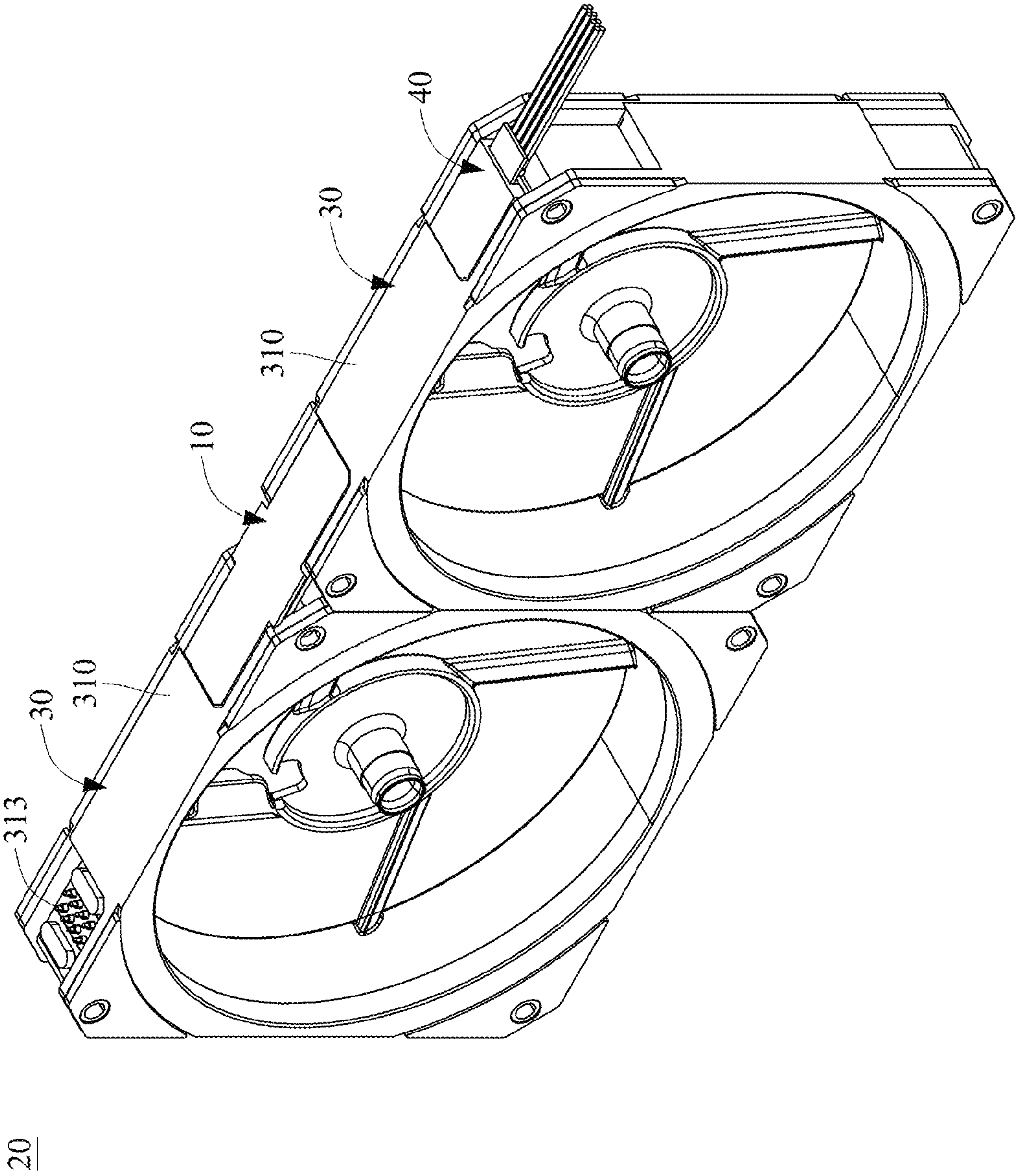
FIG. 1 illustrates a perspective view of a heat dissipation device 20 according to aspects of the present disclosure.
Figure 2A:
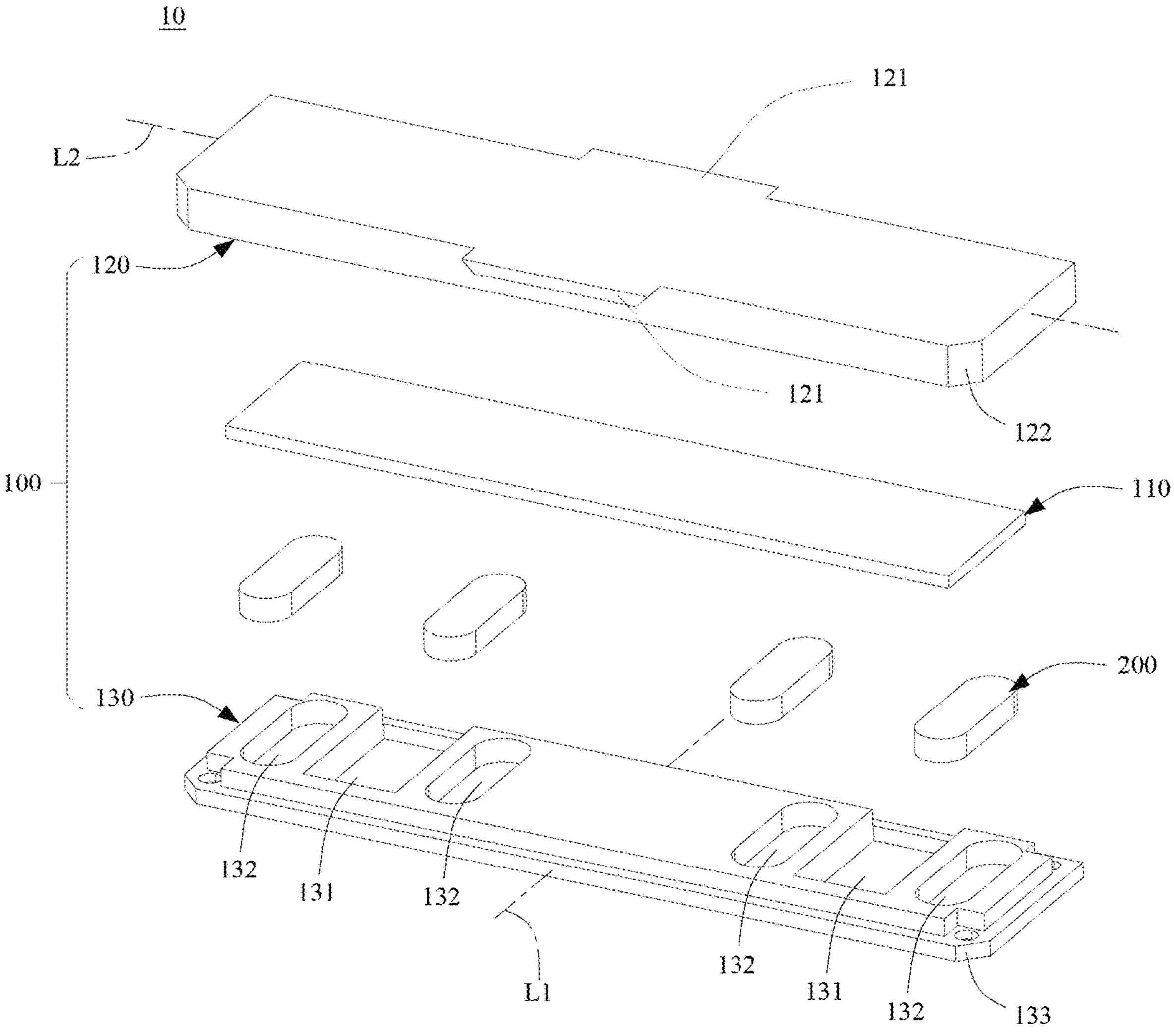
FIG. 2A illustrates an exploded view of a fastening device 10 according to aspects of the present disclosure.
Figure 2B:
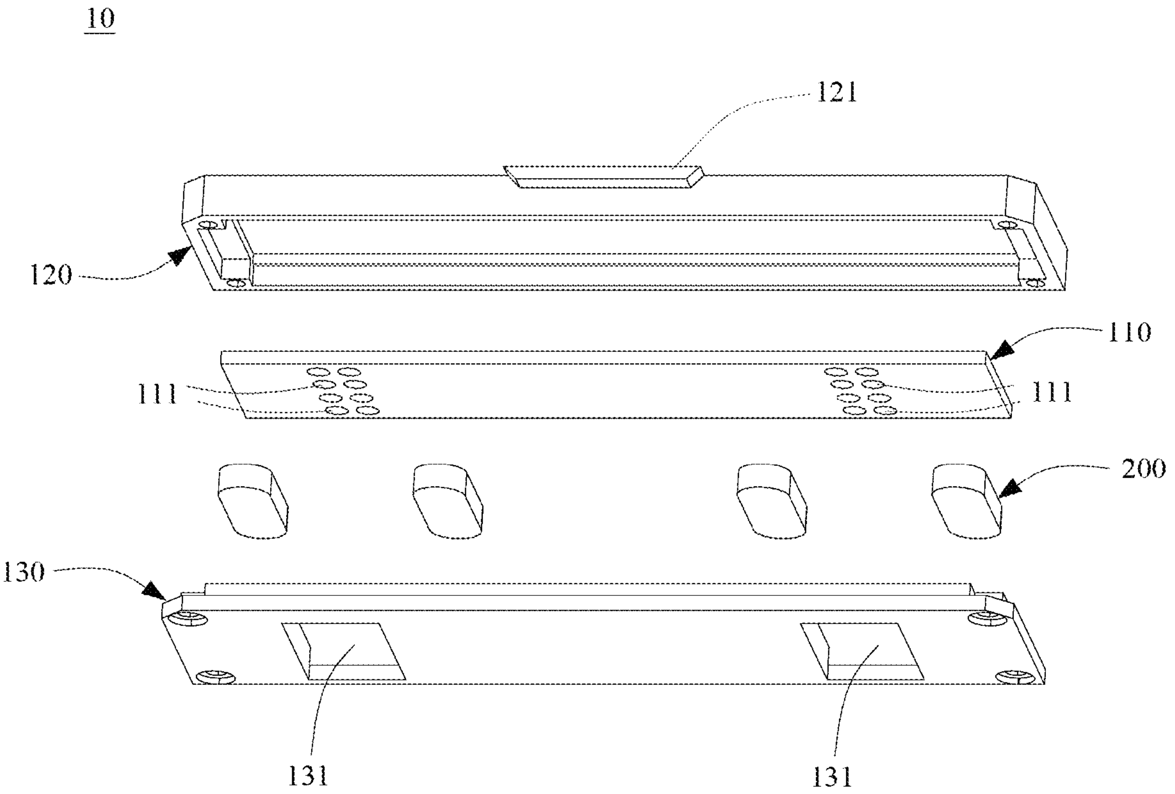
FIG. 2B illustrates the exploded view in an alternative orientation of the fastening device 10 as shown in FIG. 2A.

Referring to FIGS. 1, 2A and 2B. FIG. 1 illustrates a perspective view of a heat dissipation device 20 according to aspects of the present disclosure. FIG. 2A illustrates an exploded view of a fastening device 10 according to aspects of the present disclosure. FIG. 2B illustrates the exploded view in an alternative orientation of the fastening device 10 as shown in FIG. 2A. The heat dissipation device 20 can include multiple cooling fans 30, a wire connector 40, and a fastening device 10. Each cooling fans 30 can include a housing 310, multiple blades (not shown), and a motor (not shown). The fastening device 10 is used to connect two cooling fans 30 together. For example, as shown in FIG. 1, one fastening device 10 is used to connect two cooling fans 30. For another example, two fastening devices 10 would be needed to connect three cooling fans 30.

The fastening device 10 includes a main body 100, a contact plate 110, and a plurality of magnets 200. The main body 100 includes a cover 120 and a base 130 that can be assembled together to form at least one cavity in between. The contact plate 110 and the magnets 200 are disposed within the cavity. In this way, the cavity can accommodate and protect the internal key components, such as the contact plate 110 and the magnets 200, isolating them from external interference while preserving the overall stability and integrity of the fastening device 10. The contact plate 110 includes a plurality of conductive contacts 111 disposed at opposite ends of the contact plate 110 as shown in FIG. 2B. The conductive contacts 111 can be made of copper foil. The contact plate 110 serves as an intermediate bridge to electrically connect the conductive contacts 111 on both ends of the contact plate 110. The conductive contacts 111 are used for electrically connecting two cooling fans 300 in series.

The base 130 can include two through holes 131 that correspond to the conductive contacts 111 on the contact plate 110. This allows external devices to get in contact of the contact plate 110. For example, conductive pins 313 of the cooling fan 30 can pass through the through hole 131 and connect with the conductive contacts 111 on the contact plate 110. The through holes 131 can be symmetrically disposed along a central axis L1. In this way, external devices can be electrically connected to the contact plate 110 without compromising the overall sealing of the fastening device 10. Furthermore, through the design of the through holes 131, unnecessary openings can be avoided, thereby enhancing the waterproof and dustproof capabilities of the fastening device 10, while also enhancing the reliability and durability of the electrical connection.

The base 130 can further include a plurality of recessed slots 132 on both sides of the through hole 131 in the base 130. Magnets 200 are respectively disposed within the corresponding recessed slots 132. In this way, the magnets 200 can be securely mounted to the base 130 while maximizing the effectiveness of magnetic attraction to achieve a high-efficiency and non-destructive connection. Additionally, the design of the recessed slots 132 enhances the structural compactness of the fastening device 10, thereby reducing its overall size.

The cover 120 can include two gripping protrusions 121 that are symmetrically disposed along a central axis L2 of the cover 120. The gripping protrusions 121 provide easy operation for the user to assemble and disassemble the fastening device 10. In some embodiments, the cover 120 can include just one gripping protrusion 121. In some embodiments, the cover 120 can have no gripping protrusion or can have other types of gripping structure that provides easy operation during assembly and disassembly of the fastening device 10. The cover 120 can further include chamfers 122 at corners of the cover 120. The base 130 can further include rounded corners 133 that are corresponding to the corners of the cover 120 where the chamfers 122 are located. The chamfers 122 and rounded corners 133 can enhance the structural compactness of the fastening device 10, while facilitating the connection of the cover 120 and the base 130.

The magnets 200 as shown in FIGS. 2A and 2B are in elongated circle shape. The recessed slots 132 are respectively have the same shape as of the magnets 200 so that the magnets 200 can fit in the corresponding recessed slots 132 securely. However, the shape of the magnets 200 and the recessed slots 132 is not limited and may assume any appropriate shape. For example, the shape can be rectangle, circle, square, etc.

Figure 3B:
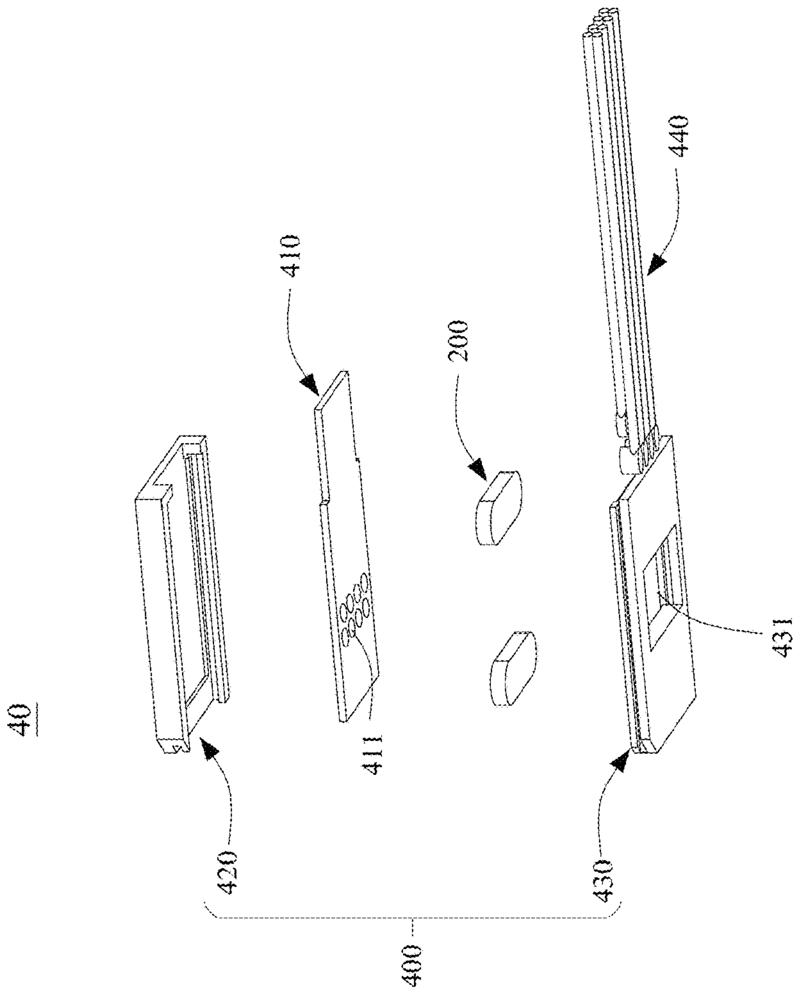
FIG. 3B illustrates the exploded view in an alternative orientation of the fastening device 10 as shown in FIG. 3A.
Figure 3A:
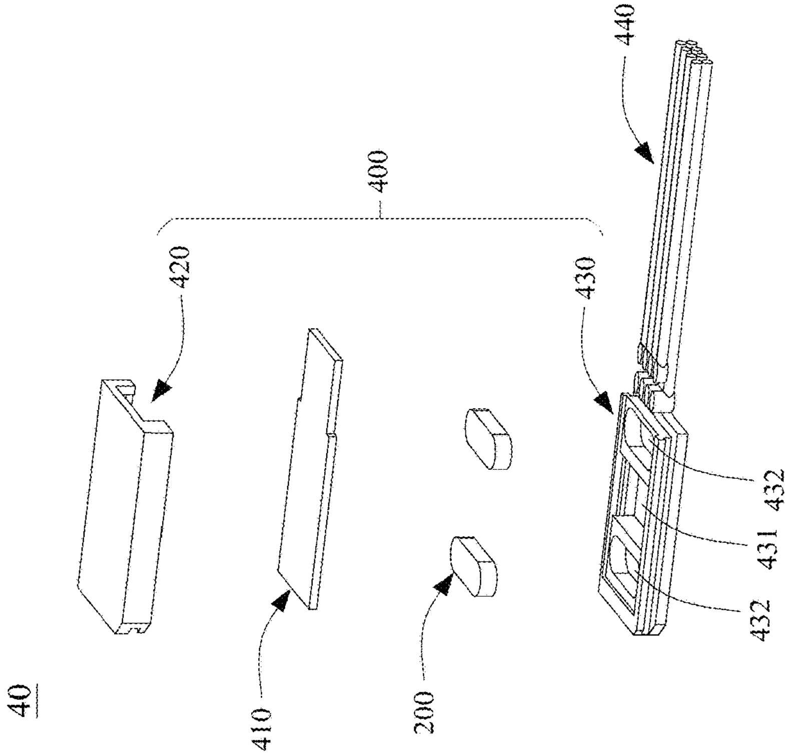
FIG. 3A illustrates an exploded view of a wire connector 40 according to aspects of the present disclosure.

Please refer to FIGS. 3A and 3B. FIG. 3A illustrates an exploded view of a wire connector 40 according to aspects of the present disclosure. FIG. 3B illustrates the exploded view in an alternative orientation of the fastening device 10 as shown in FIG. 3A. Similar to the fastening device 10, the wire connector 40 includes a housing 400, a contact plate 410, a plurality of magnets 200, and wires 440. The wire connector 40 is very much a smaller version of the fastening device 10 with wires. The housing 400 includes a cover 420 and a base 430 that can be assembled together to form at least one cavity in between. The contact plate 410 and the magnets 200 are disposed within the cavity. Similar to the contact plate 110, the contact plate 410 can include multiple conductive contacts 411. The base 430 can include a through hole 431 that correspond to the position of the conductive contacts 411 on the contact plate 410. The base 430 can further include a plurality of recess slots 432 on both sides of the through hole 431 in the base 430. Magnets 200 are respectively disposed within the corresponding recessed slots 132. Each conductive contacts 411 is corresponding to one wire 440 or a set of wires 440. The wires 440 can be connected to an external power source (not shown) or other components of a PC or a server. The wires 440 can provide power to the heat dissipation device 20. The wires 440 can also provide data to and from the heat dissipation device 20 during operation and testing. Each of conductive contacts 411 can be electrically connected to a corresponding conductive pin 313 of the cooling fan 30. As such, the heat dissipation device 20 can have two cooling fans 30 connected to each other in series via the fastening device 10, and to external components via the wire connector 40.

Figure 4:
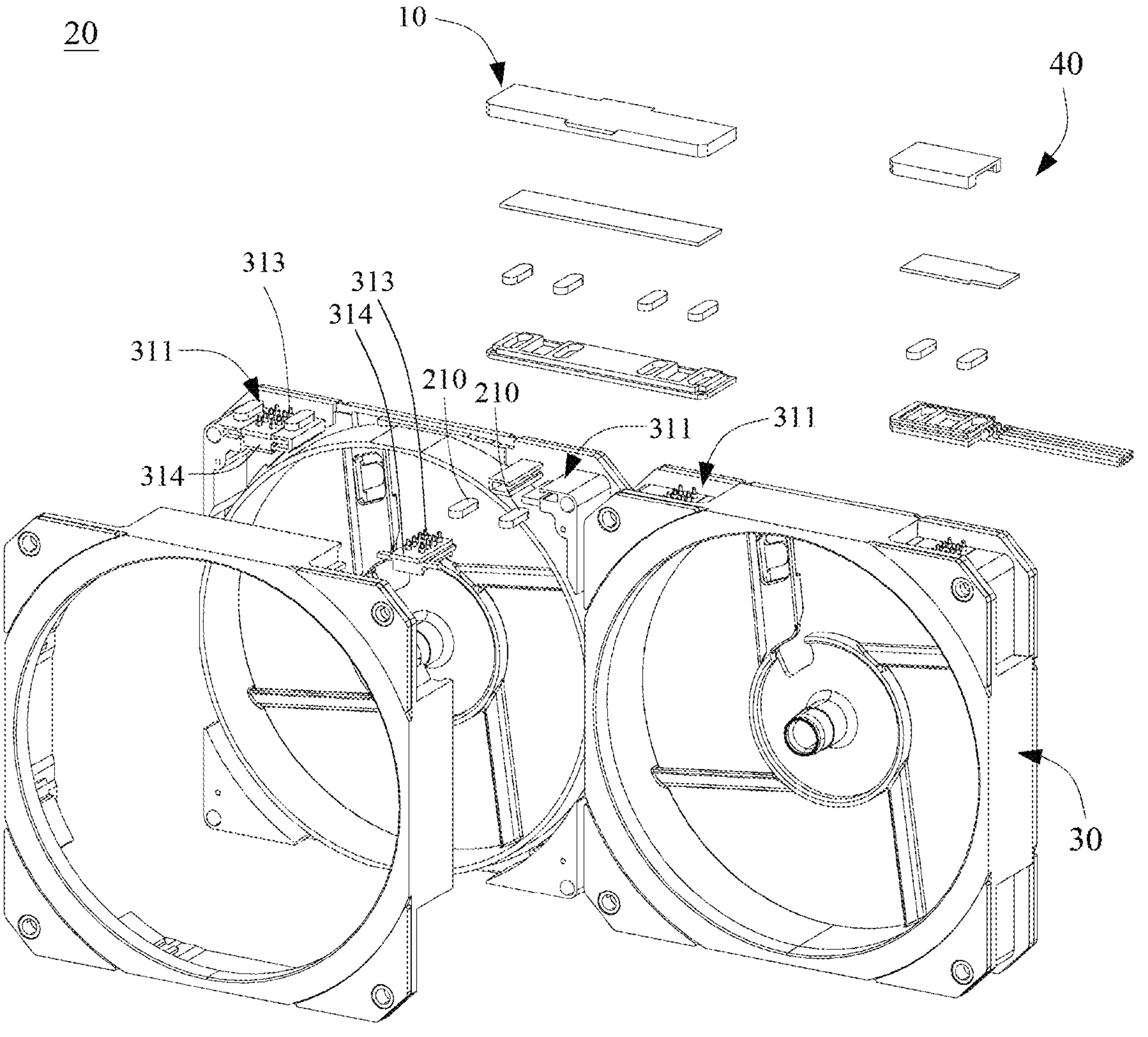
FIG. 4 illustrates a partially exploded view of the heat dissipation device 20 as shown in FIG. 1.
Figure 5:
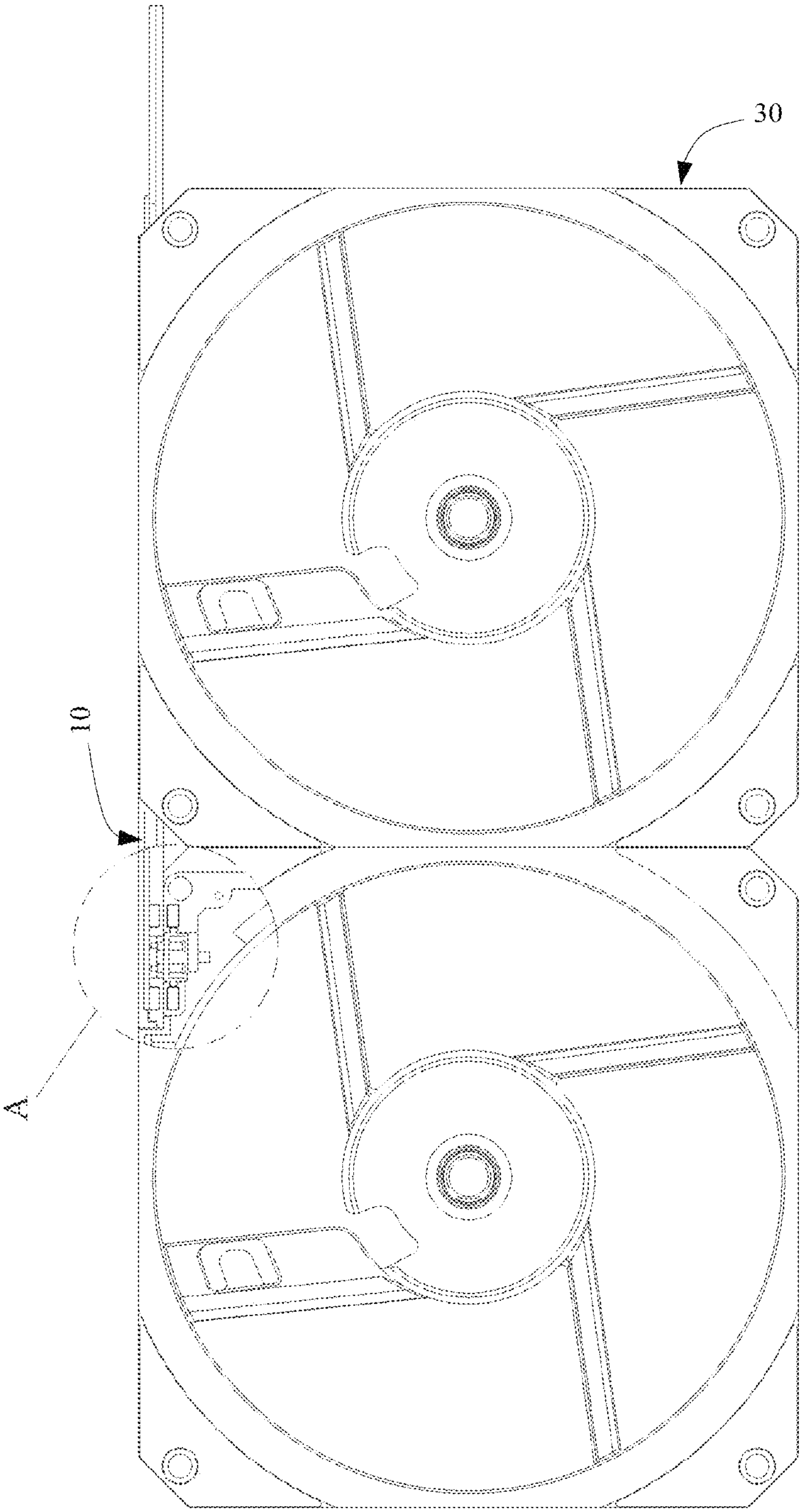
FIG. 5 illustrates a front view of the heat dissipation device 20 as shown in FIG. 1.
Figure 6:
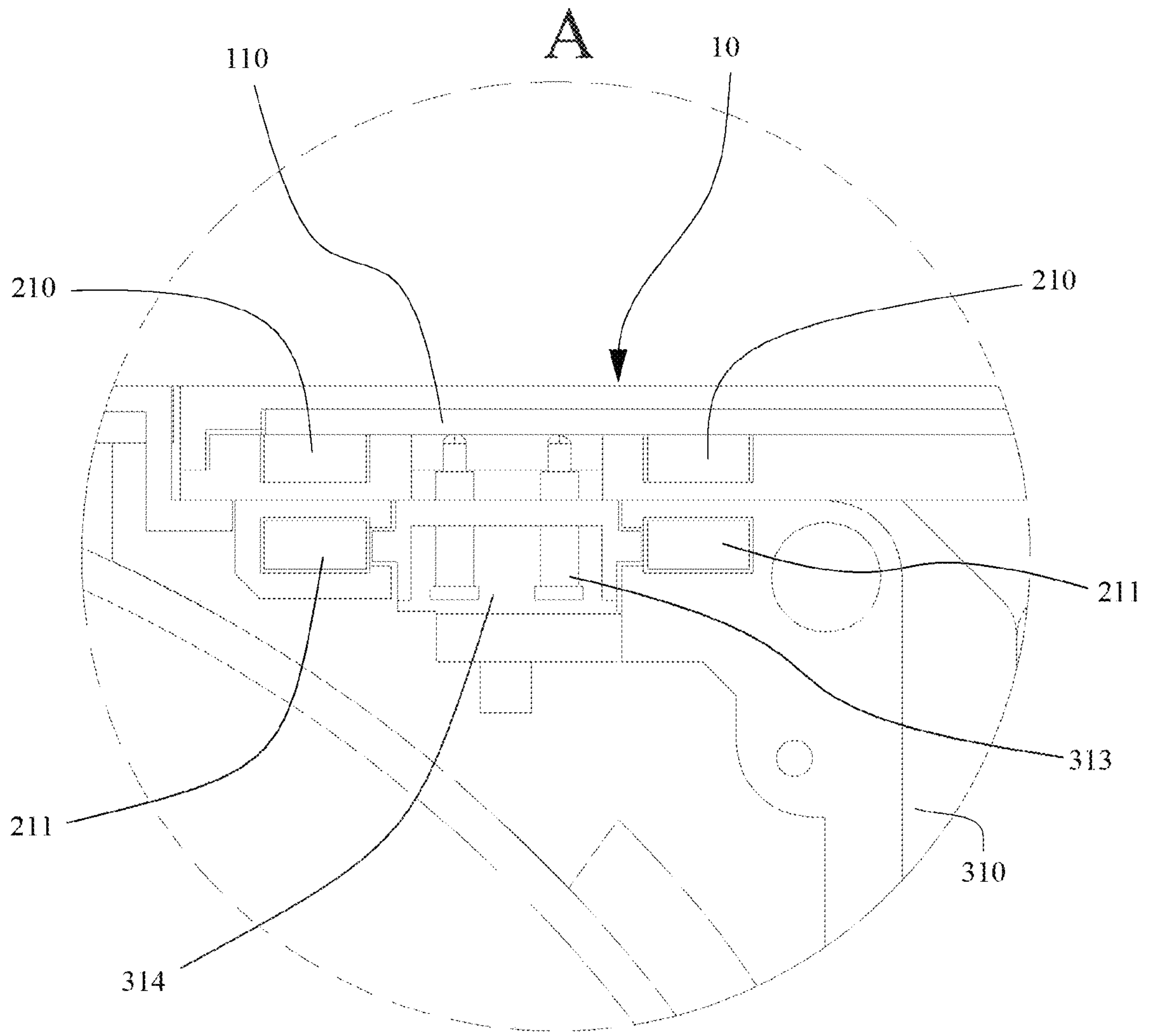
FIG. 6 illustrates a partially enlarged view of the heat dissipation device 20 as shown in FIG. 5.

Please also refer to FIGS. 4-6. FIG. 4 illustrates a partially exploded view of the heat dissipation device 20 as shown in FIG. 1. FIG. 5 illustrates a front view of the heat dissipation device 20 as shown in FIG. 1. FIG. 6 illustrates a partially enlarged view of the heat dissipation device 20 as shown in FIG. 5.

Each cooling fan 30 includes at least two contact regions 311 and each contact regions 311 includes multiple conductive pins 313 that are disposed on a conductive pin mounting base 314. Two magnets 210 are disposed in each contact region 311. The magnets 210 can be partially enclosed by the conductive pin mounting base 314 so that they are secured within the cooling fan 30. The position of the magnets 210 is corresponding to the position of the magnets 200 of the fastening device 10. This way, the magnets 200 and the magnets 210 can be attracted to each other and form a strong connection to ensure the security of the cooling fans 30 via the fastening device 10. The conductive pins 313 can be made of any conductive material. For example, the conductive pins 313 can be made of copper, silver, or gold, or any combination thereof. Each conductive pin mounting base 314 has the same number of conductive pins 313. The number of conductive pins 313 on each conductive pin mounting base 314 is equal to the number of conductive contacts 111 on one end of the contact plate 110. The conductive pin mounting bases 314 of a single cooling fan 30 are electrically connected to each other internally of the housing 310. The conductive pin mounting base 314 are also electrically connected to other components of the cooling fan 30 internally. For example, two corresponding conductive pins 313 can connect to a corresponding component within the cooling fan 30. When the heat dissipation device 20 is fully assembled, the conductive pins 313 are in contact with the conductive contacts 111 of the fastening device 10. As such, any two cooling fans 30 can be connected in series through the adjacent two contact regions 311 and the fastening device 10.

By utilizing the fastening device 10 and the wire connector 40, cooling fans 30 can minimize exposed individual wires, reducing the need for complex wire arrangement. A single wire connector and plurality of fastening device can connect multiple cooling fans together, making the heat dissipation device infinitely expandable to suit a wide range of application. Furthermore, by reducing the number of exposed wires within, the neatness of interior of the heat dissipation device 20 can be enhanced as can the influence of the wires on the airflow, thereby increasing the heat dissipation efficiency of the heat dissipation device 20.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure.

The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:

1. A heat dissipation device, comprising:

a plurality of cooling fans each having at least one contact region having a plurality of conductive pins and at least one first magnet; and at least one fastening device, including:

a main body having a cover and a base where the cover is configured to be disposed on the base to form a cavity within;

a contact plate disposed within the cavity, the contact plate includes a plurality of conductive contacts that are disposed on a side of the contact plate that faces towards the base, the base includes at least one through hole and a plurality of recessed slots, the through hole is corresponds to positions of conductive contacts and the conductive pins are configured to penetrate through the at least one through hole and electrically connect to the conductive contacts, and each recessed slot is disposed on one side of the through hole and each magnet is disposed within a respective recessed slot; and at least one second magnet disposed within the cavity, wherein the fastening device is configured to electrically connect the cooling fans in series via the first magnet and the second magnet.

2. The heat dissipation device of claim 1, wherein the cover includes two gripping protrusions that are symmetrically disposed along a central axis of the cover.

3. The heat dissipation device of claim 1, wherein the cover includes at least one chamfered corner.

4. The heat dissipation device of claim 1, wherein the base includes at least one rounded corner.

5. The heat dissipation device of claim 1, wherein the cooling fan includes a fan housing, a fan blade, and a motor, the conductive pins are disposed on the fan housing, the fan blade and the motor are disposed in the fan housing, the fan blade rotates relative to the fan housing.

6. A fastening device, comprising:

a main body having a cover and abase where the cover is configured to be disposed on the base to form a cavity within;

a contact plate disposed within the cavity, the contact plate includes a plurality of conductive contacts that are disposed on a side of the contact plate that faces towards the base, the base includes at least one through hole and a plurality of recessed slots, the through hole is corresponds to positions of conductive contacts and the conductive pins are configured to penetrate through the at least one through hole and electrically connect to the conductive contacts, and each recessed slot is disposed on one side of the through hole and each magnet is disposed within a respective recessed slot; and at least one magnet disposed within the cavity.

7. The fastening device of claim 6, wherein the cover includes two gripping protrusions that are symmetrically disposed along a central axis of the cover.

8. The fastening device of claim 6, wherein the cover includes at least one chamfered corner.

9. The fastening device of claim 6, wherein the base includes at least one rounded corner.

* * * * *